Jan. 15, 1963 A. J. MARKO 3,073,963

SHIFT REGISTER

Filed Oct. 21, 1960 2 Sheets-Sheet 1

INVENTOR
ALBERT J. MARKO
BY Theodore Jay Jr.
ATTORNEY

INVENTOR
ALBERT J. MARKO
BY Theodore Jay Jr.
ATTORNEY

United States Patent Office 3,073,963
Patented Jan. 15, 1963

3,073,963
SHIFT REGISTER

Albert J. Marko, Deer Park, N.Y., assignor to General Telephone and Electronics Laboratories, Inc., a corporation of Delaware Filed Oct. 21, 1960, Ser. No. 64,124
8 Claims. (Cl. 250—213)

My invention is directed toward shift registers.

A shift register is a device wherein an ordered set of information elements can be stored and thereafter shifted by one or more element positions with respect to the original position of the stored set. Shift registers are widely used in electronic digital computers wherein the set can represent a number in binary notation, the number being shifted one or more binary digits to the left or right of the original position as required, for example, in various arithmetic operations of the computer such as multiplication or division.

I have invented a new type of shift register wherein the information elements are supplied thereto in the form of electrical signals and wherein the stored set is visually displayed as a pattern of illuminated and dark areas.

My register, which employs electroluminescent cells and photoconductive elements, uses no moving parts. It can be easily fabricated at low cost. Since the electroluminescent cells are operated as bistable units which either emit light or are dark, my register is particularly adapted to receive, store, shift and display numbers in binary notation. Moreover, my register is relatively insensitive both to changes in intensity of the light emitted from the electroluminescent cells and to variations in the photoconductive sensitivities of the various photoconductive elements.

In accordance with the principles of my invention, I provide a linear array of N different electroluminescent cells where N is any integer in excess of 2. These cells are so arranged that the second cell precedes the first cell, the third cell precedes the second cell and so on.

First, second and third sets of photoconductive elements are associated with this linear array.

The first set contains $(N-1)$ different photoconductive elements. Each electroluminescent cell other than the first cell in the array is electrically connected in series with a corresponding first set element. In addition, each first set element is optically coupled to the electroluminescent cell which immediately precedes the electroluminescent cell which is electrically connected to this element.

The second set also contains $(N-1)$ different photoconductive elements. Each electroluminescent cell other than the first cell in the array is optically coupled to a corresponding second set element. Moreover, each second set element is electrically connected in series with the electroluminescent cell which immediately precedes the electroluminescent cell which is optically coupled to this element.

The third set contains N different photoconductive elements. Each third set element is optically coupled to, and electrically connected in series with, a corresponding cell.

Each electroluminescent cell is adapted to display information in binary form, the cell for example being energized and emitting light to display a "1" and being deenergized and dark to display a "0."

Each photoconductor element represents a high impedance when in the dark and represents a low impedance when illuminated by an electroluminescent cell optically coupled to the element.

Information in the form of binary digits is supplied to the first cell in the array. Clock pulses are also supplied to all cells in the array. Each time a clock pulse is so supplied, each binary digit previously stored in an electroluminescent cell is shifted or transferred out of this cell into an adjacent cell.

As will be explained in more detail hereinafter, the first set of photoconductive elements is used to transfer binary digits from one cell to another. The second set of elements is used in erasing the stored digit in each cell as this digit is transferred to the next cell. The third set of elements is used in storing the digit in each cell during the periods when clock pulses are not present.

An illustrative embodiment of my invention will now be described with reference to the accompanying drawings wherein.

Figure 1:
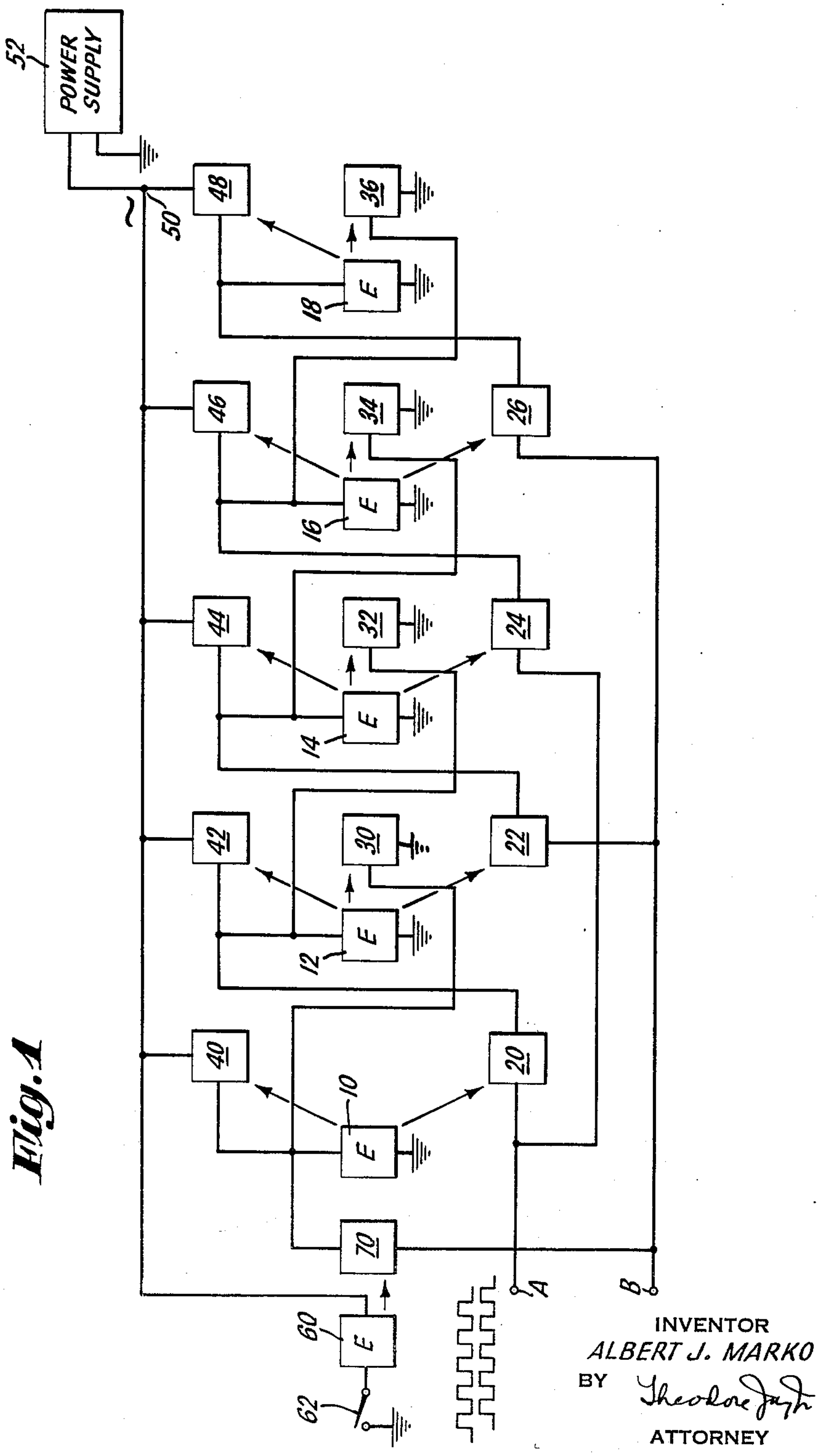
FIG. 1 is a schematic diagram of my invention wherein the electroluminescent cells and photoconductive elements are shown in block form.

Referring now to FIG. 1, there is shown a linear array of N different electroluminescent cells where N is any integer in excess of 2. The second cell precedes the first cell, the third cell precedes the second cell, and in general the $(a)$th cell in the array precedes the $(a-1)$ cell where $a$ is any integer which does not exceed N. In this example, there are five cells 10, 12, 14, 16 and 18. Each of these cells is grounded on one side.

First, second and third sets of photoconductive elements are associated with the linear array of cells.

The first set consists of $(N-1)$ different photo-conductive elements, in this example elements 20, 22, 24 and 26. Each electroluminescent cell other than the first electroluminescent cell 10 is electrically connected in series with a corresponding first set element. More particularly, cells 12, 14, 16 and 18 are each connected in series with a corresponding one of elements 20, 22, 24 and 26 respectively. Further, elements 20, 22, 24 and 26 are each optically coupled to a corresponding one of cells 10, 12, 14 and 16 respectively. (Note that cells 12 and 16 are connected through corresponding elements 20 and 24 to terminal A, while cells 14 and 18 are connected through corresponding elements 22 and 26 to terminal B.)

The second set consists of $(N-1)$ different photoconductive elements, in this example elements 30, 32, 34 and 36. One end of these elements is grounded. Each electroluminescent cell other than the first electroluminescent cell 10 is optically coupled to a corresponding second set element, i.e. electroluminescent cells 12, 14, 16 and 18 are each optically coupled to a corresponding one of elements 30, 32, 34 and 36. Further, the second set elements are each electrically connected in series with a corresponding one of electroluminescent cells 10, 12, 14 and 16 respectively.

The third set consists of N different photoconductive elements, in this example elements 40, 42, 44, 46 and 48. Each of these elements 40, 42, 44, 46 and 48 is optically coupled to a corresponding one of electroluminescent cells 10, 12, 14, 16 and 18. Further, each of these elements 40, 42, 44, 46 and 48 is electrically connected in series with a corresponding one of electroluminescent cells 10, 12, 14, 16 and 18. One side of each of the third set elements is connected to the high voltage terminal 50 of an alternating voltage power supply 52.

An electroluminescent control element 60 is connected in series with switch 62, this series arrangement being connected between terminal 50 and ground. A photoconductive cell 70 is connected in series with electroluminescent cell 10, one end of photoconductive cell 70 being connected to terminal B.

A first pulse train containing equidistantly spaced positive pulses is applied between terminal A and ground. Similarly a second pulse train containing equidistantly spaced positive pulses is applied between terminal B and ground. The pulses in the two trains are in antiphase; i.e. a pulse in either of these trains is in time synchronism with a pulse space (i.e. "no pulse") in the other train.

In order for the device thus far described to act as a shift register, the binary information is supplied to the register digit by digit in synchronism with the pulses in the second pulse train supplied to terminal B. The information in the register is shifted from one electroluminescent cell to the next cell in synchronism with the pulses in the first pulse train supplied to terminal A. The character of the binary digits supplied is determined by the position of the switch 62 when a pulse in the second train arrives at terminal B, being a binary 1 when the switch is closed and a binary C when the switch is open.

More particularly, the operation is as follows. To supply a "1," switch 62 is closed. Electroluminescent control element 60 is then energized and emits light. This light triggers the photoconductive cell 70 into its low impedance state. Then, provided switch 62 remains closed until the arrival of the first pulse in the second train at terminal B, this pulse passes through the low impedance of photoconductive cell 70 and energizes the first electroluminescent cell 10. This cell then emits light and triggers the first set element 20 and the third set element 40 into the low impedance state. Element 40 then clamps electroluminescent cell 10 to the power supply 52, and cell 10 will continue to emit light and indicate a stored binary 1 until the arrival of the first pulse in the first train at terminal A.

When the first pulse in the second train appears at terminal A, this pulse passes through the low impedance element 20 and energizes the second cell 12. This action shifts the binary 1 from electroluminescent cell 10 to electroluminescent cell 12. Cell 12 then emits light and triggers the first set element 22, the second set element 30 and the third set element 42 into the low impedance state. Element 30 then short-circuits electroluminescent cell 10, which is then extinguished, thus erasing the information previously stored in electroluminescent cell 10. Element 42 then clamps electroluminescent cell 12 to the power supply, thus storing the transferred binary digit in electroluminescent cell 12.

Upon the arrival of the second pulse in the second train at terminal B, if switch 62 is open, cell 10 will remain dark and indicate a binary 0. (If this switch is closed, then cell 10 will be energized in the manner previously indicated and will indicate a binary 1.) At the same time, this second pulse in the second train energizes the third electroluminescent cell 14 which then indicates a binary 1, this digit being stored by virtue of the clamping action of the corresponding third set element 44. Note that when the third cell 14 is lit, the second set element 32 is placed into its low impedance state and the second electroluminescent cell 12 is short-circuited and extinguished.

At this point, a binary 0 is stored in electroluminescent cell 10 while a binary 1 is stored in electroluminescent cell 14.

Upon the arrival of the second pulse in the first train at terminal A, the information stored in electroluminescent cells 10 and 14 will be transferred to electroluminescent cells 12 and 16 respectively. Then upon the arrival of the third pulse in the second train at terminal B, the information stored in electroluminescent cells 12 and 16 will be transferred to electroluminescent cells 14 and 18 respectively. At the same time a binary 1 or 0 (depending upon the position of switch 62) will be read into electroluminescent cell 10. At this point, the register is full, the stored data being displayed by cells 10, 14 and 18.

The register can then be cleared by opening switch 62 for a sufficient period to permit the information stored in electroluminescent cell 10 to be transferred successively into, then out of, electroluminescent cells 12, 14, 16 and 18.

One structure which functions in the manner described above is shown in FIGS. 2 and 3.

A glass substrate 82 is coated with two separate coplanar conductive films 80 and 78. Six separate parallel coplanar electroluminescent layers 76 are applied over films 80 and 78. Six separate parallel transparent electrodes 74 are applied in registration with the six electroluminescent layers, thus forming the five electroluminescent cells and the electroluminescent control element required in FIG. 1.

Three separate parallel strips 72 of a transparent electrically non-conductive enamel are applied over the electrodes 74 and extend transversely thereof.

Figure 2:
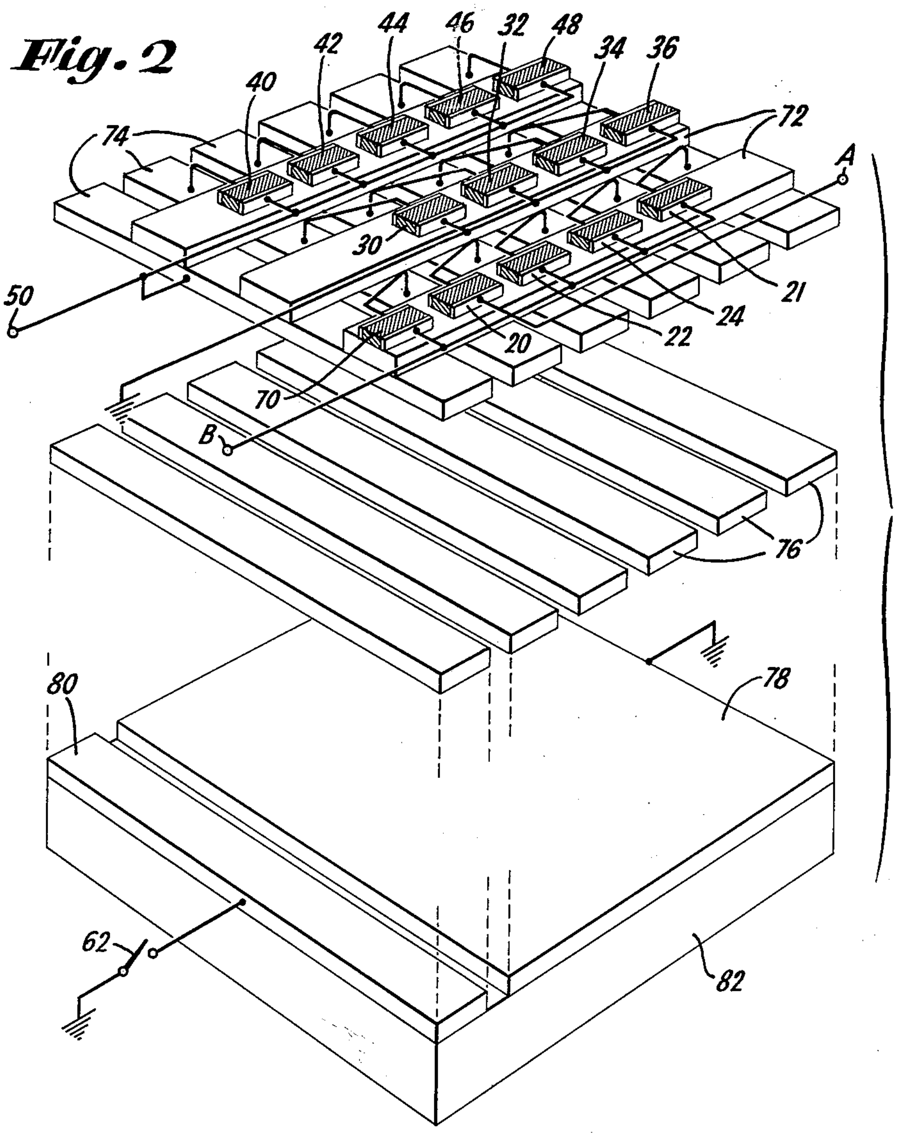
FIG. 2 is an exploded view of a structure satisfying the schematic relationships of FIG. 1.

The first set of photoconductors 20, 22, 24 and 26 are applied over the bottom strip 72 in FIG. 2. These photoconductive elements comprise two separated electrodes and a photoconductive layer in between. Note that each of these elements is optically coupled to the electroluminescent cell immediately below and is electrically connected to the top electrode 74 of the electroluminescent cell to the right of the element.

The second set of photoconductive elements 30, 32, 34 and 36 are applied over the middle strip 72. Each of the second set elements is optically coupled to the electroluminescent cell immediately below and is electrically connected to the top electrode 74 of the electroluminescent cell to the left of the element.

The third set of photoconductive elements 40, 42, 44, 46 and 48 are applied over the top strip 72. Each of the third set elements is optically coupled to the electroluminescent cell immediately below and is electrically connected to the top electrode 74 of this electroluminescent cell.

Figure 3:
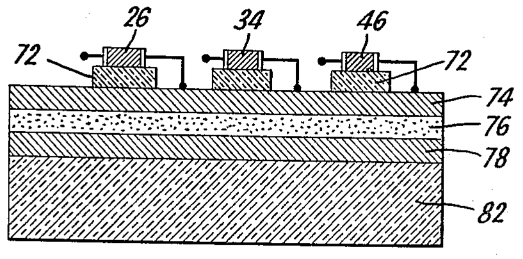
FIG. 3 is a cross sectional view of the structure of FIG. 2.

It will be seen from FIGS. 2 and 3 that the various sets of photoconductive elements, the electroluminescent cells and the electroluminescent control element are electrically connected in the same manner as shown schematically in FIG. 1.

What is claimed is:

1. An electroluminescent device comprising a linear array of N different electroluminescent cells where N is any integer in excess of 2, the $(a)$th cell in the array immediately preceding the $(a-1)$th cell where $a$ is any integer no larger than N; a first set of $(N-1)$ different photoconductive elements, each cell other than the first cell being electrically connected in series with a corresponding first set element, each first set element being optically coupled to the cell immediately preceding the cell corresponding to said each first set element; and a second set of $(N-1)$ different photoconductive elements, each cell other than the first cell being optically coupled to a corresponding second set element, each second set element being electrically connected in series with the cell immediately preceding the cell corresponding to said second set element.

2. An electroluminescent device comprising a linear array of N different electroluminescent cells where N is any integer in excess of 2, the $(a)$th cell in the array immediately preceding the $(a-1)$th cell where $a$ is any integer no larger than N; a first set of $(N-1)$ different photoconductive elements, each cell other than the first cell being electrically connected in series with a corresponding first set element, each first set element being optically coupled to the cell immediately preceding the cell corresponding to said each first set element; a second set of $(N-1)$ different photoconductive elements, each cell other than the first cell being optically coupled to a corresponding second set element, each second set element being electrically connected in series with the cell immediately preceding the cell corresponding to said second set element; and a third set of N different photoconductive elements, each third set element being optically coupled to, and electrically connected in series with, a corresponding cell.

3. An electroluminescent device comprising a linear array of N different electroluminescent cells where N is any integer in excess of 2, the (a)th electroluminescent cell in the array immediately preceding the (a—1)th electroluminescent cell where a is any integer no larger than N; a first set of (N—1) different photoconductive elements, each electroluminescent cell other than the first electroluminescent cell being electrically connected in series with a corresponding first set photoconductive element, each first set photoconductive element being optically coupled to the electroluminescent cell immediately preceding the electroluminescent cell corresponding to said each first set photoconductive element; a second set of (N—1) different photoconductive elements, each electroluminescent cell other than the first electroluminescent cell being optically coupled to a corresponding second set photoconductive element, each second set photoconductive element being electrically connected in series with the electroluminescent cell immediately preceding the electroluminescent cell corresponding to said second set photoconductive element; a third set of N different photoconductive elements, each third set photoconductive element being optically coupled to, and electrically connected in series with, a corresponding electroluminescent cell; an electroluminescent control element; and a photoconductive cell optically coupled to said electroluminescent control element and electrically connected in series with the first electroluminescent cell in said array.

4. An electroluminescent device comprising a linear array of N different electroluminescent cells where N is any integer in excess of 2, the (a)th cell in the array immediately preceding the (a—1)th cell where a is any integer no larger than N; a first set of (N—1) different photoconductive elements, each cell other than the first cell being optically coupled to a corresponding first set element, each first set element being electrically connected in series with the cell immediately preceding the cell corresponding to said first set element; and a second set of N different photoconductive elements, each second set element being electrically coupled to, and electrically connected in series with, a corresponding cell.

5. An electroluminescent device comprising a linear array of N different electroluminescent cells where N is any integer in excess of 2, the (a)th cell in the array immediately preceding the (a—1)th cell where a is any integer no larger than N, each electroluminescent cell including an electroluminescent layer and first and second spaced apart electrodes secured thereto, the first electrodes of all of said cells being connected in common to a first terminal; a first set of (N—1) different photoconductive elements, each first set element including a photoconductive layer and first and second spaced apart electrodes secured thereto, the second electrode of each cell other than the first cell being electrically connected to the first electrode of a corresponding first set element, each first set element being optically coupled to the cell immediately preceding the cell corresponding to said each first set element, the second electrodes of all first set elements being connected in common to a second terminal; a second set of (N—1) different photoconductive elements, each second set element including a photoconductive layer and first and second spaced apart electrodes secured thereto, each cell other than the first cell being optically coupled to a corresponding second set element, the first electrode of each second set element being electrically connected to the second electrode of the cell immediately preceding the cell corresponding to said second set element; and a third set of N different photoconductive elements, each third set element including a photoconductive layer and first and second spaced apart electrodes secured thereto, each third set element being optically coupled to a corresponding cell, the first electrode of each third set element being electrically connected to the second electrode of the corresponding cell, the second electrodes of all of said third set elements being connected in common to a third terminal.

6. An electroluminescent device comprising a linear array of N different electroluminescent cells where N is any integer in excess of 2, the (a)th cell in the array immediately preceding the (a—1)th cell where a is any integer no larger than N, each electroluminescent cell including an electroluminescent layer and first and second spaced apart electrodes secured thereto, the first electrodes of all of said cells being connected in common to a first terminal; a first set of (N—1) different photoconductive elements, each first set element including a photoconductive layer and first and second spaced apart electrodes secured thereto, the second electrode of each cell other than the first cell being electrically connected to the first electrode of a corresponding first set element, each first set element being optically coupled to the cell immediately preceding the cell corresponding to said each first set element, the second electrodes of all first set elements being connected in common to a second terminal; a second set of (N—1) different photoconductive elements, each second set element including a photoconductive layer and first and second spaced apart electrodes secured thereto, each cell other than the first cell being optically coupled to a corresponding second set element, the first electrode of each second set element being electrically connected to the second electrode of the cell immediately preceding the cell corresponding to said second set element; and a third set of N different photoconductive elements, each third set element including a photoconductive layer and first and second spaced apart electrodes secured thereto, each third set element being optically coupled to a corresponding cell, the first electrode of each third set element being electrically connected to the second electrode of the corresponding cell, the second electrodes of all of said third set elements being connected in common to a third terminal, the first and second terminals being interconnected, said interconnected first and second terminals and said third terminal being adapted for connection to a power supply.

7. An electroluminescent device comprising a linear array of N different electroluminescent cells where N is any integer in excess of 2, the (a)th cell in the array immediately preceding the (a—1)th cell where a is any integer no larger than N, each electroluminescent cell including an electroluminescent layer and first and second spaced apart electrodes secured thereto, the first electrodes of all of said cells being connected in common to a first terminal; a first set of (N—1) different photoconductive elements, each first element including a photoconductive layer and first and second spaced apart electrodes secured thereto, the second electrode of each cell other than the first cell being electrically connected to the first electrode of a corresponding first set element, each first set element being optically coupled to the cell immediately preceding the cell corresponding to said each first set element, the second electrodes of all first set elements being connected in common to a second terminal; a second set of (N—1) different photoconductive elements, each second set element including a photoconductive layer and first and second spaced apart electrodes secured thereto, each cell other than the first cell being optically coupled to a corresponding second set element, the first electrode of each second set element being electrically connected to the second electrode of the cell immediately preceding the cell corresponding to said second set element; and a third set of N different photoconductive elements, each third set element including a photoconductive layer and first and second spaced apart electrodes secured thereto, each third set element being optically coupled to a corresponding cell, the first electrode of each third set element being electrically connected to the second electrode of the corresponding cell, the second electrodes of all of said third set elements being connected in common to a third terminal, the second electrodes of all odd numbered second set elements being connected in common to a fourth terminal, the second electrodes of all even numbered second set elements being connected in common to a fifth terminal.

8. An electroluminescent device comprising N different electroluminescent cells arranged in a linear array where N is any integer in excess of 2, each electroluminescent cell having an electroluminescent layer and first and second electrodes secured to opposite surfaces of said electroluminescent layer, the electroluminescent second cell electrodes being transparent, the first electrodes of said cells being electrically interconnected; first, second and third electrically insulating transparent layers, each transparent layer extending over a corresponding portion of each of the second electrodes of said cells, said transparent layers being spaced apart from each other; and first, second and third sets of photoconductive elements, each element having a photoconductive layer and first and second electrodes secured to the photoconductive layer in spaced apart positions, each of said first and second sets including $(N-1)$ different elements, said third set including N different elements, each of the portions of the first transparent layer in contact with the second electrodes of each of the cells other than the first cell supporting a corresponding first set element, each of the portions of the second transparent layer in contact with the second electrodes of each of the cells other than the last cell supporting a corresponding second set element, each of the portions of the third transparent layer in contact with the second electrodes of each of the cells supporting a corresponding third set element, the first electrodes of said first set elements being connected together, the first electrodes of the odd numbered second set elements being connected together, the first electrodes of the even numbered second set elements being connected together, the first electrodes of said third set elements being connected together, the second electrode of any first set element being connected to the second electrode of the cell immediately preceding the cell corresponding to said any first set element, the second electrode of any second set element being connected to the second electrode of the cell immediately succeeding the cell corresponding to any first set element, the second electrode of any third set element being connected to the second electrode of the cell corresponding to any third set element.

References Cited in the file of this patent

UNITED STATES PATENTS 2,900,522 Reis ________________ Aug. 18, 1959
2,985,763 Ress ________________ May 23, 1961